K. NOLAN.
Churns.
No. 154,187.
Patented Aug. 18, 1874.
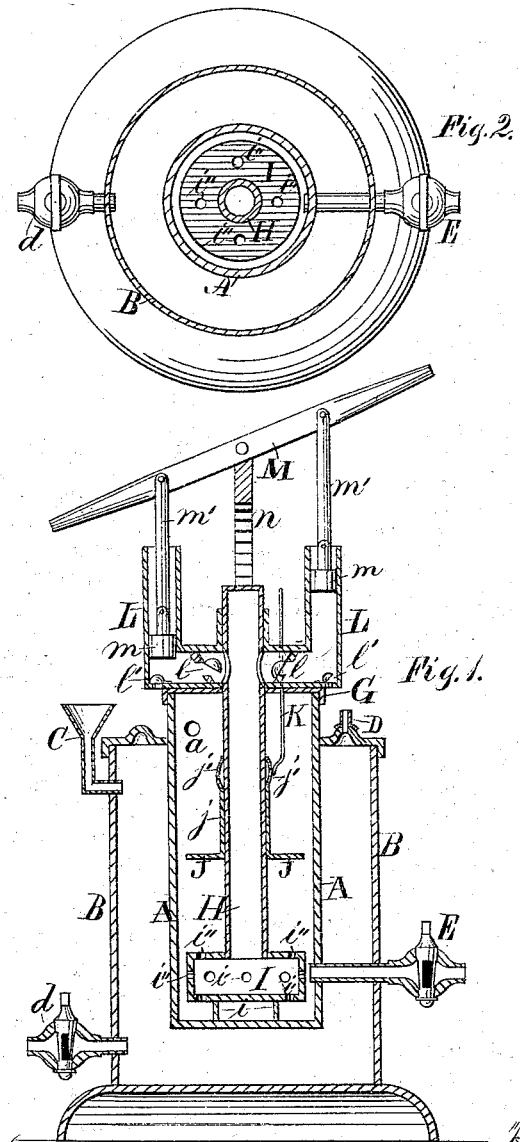

UNITED STATES PATENT OFFICE.

KAYRIN NOLAN, OF GALESBURG, ILLINOIS, ASSIGNOR OF ONE-HALF HIS RIGHT TO BERNARD RYAN, OF SAME PLACE.

IMPROVEMENT IN CHURNS.

Specification forming part of Letters Patent No. 154,187, dated August 18, 1874; application filed January 6, 1874.

*To all whom it may concern:*

Be it known that I, KAYRIN NOLAN, of Galesburg, county of Knox and State of Illinois, have invented certain Improvements in Churns, of which the following is a specification:

The nature of my invention relates to improvements in that class of churns known as "atmospheric churns;" and the invention consists in the improved construction of the distributer for discharging the air into the churn, and in the arrangement therewith of an adjustable disk upon the air-feeding tube of the said distributer, which disk serves to aid in collecting the floating butter as it is formed, and also in giving the desired direction to the currents formed by the air through the milk or cream, the churn proper being surrounded by a water-reservoir, by which the temperature may be regulated, and the whole device constructed and arranged to form a compact, portable, cheap, and efficient churn, all as hereinafter fully described.

In the accompanying drawing, Figure 1 is a vertical central sectional view of a churn embodying my invention, and Fig. 2 is a horizontal sectional view.

Referring to the parts by letters, letter A represents a cylindrical vessel, constituting the churn proper. B represents a vessel somewhat larger than A, and surrounding the vessel A from near its upper end downward. C and D are pipes, communicating with the interior of the annular space between the vessels A and B, and $d$ is a stop-cock communicating with the same. E is a stop-cock communicating with the interior of the vessel A. $a$ is a small hole in the vessel A immediately above the top of the vessel B. G is a closely-fitting cap or lid for the vessel A. H is a pipe extending upward above and downward centrally through the cap G, and provided with a cylindrical-shaped enlargement, I, on its lower end, which, in turn, is supported upon the bottom of the vessel A by a support or base, $i$. The circumference and sides of the cylinder I are pierced with holes $i'$ $i''$, respectively. J is a disk, with a tube, $j$, extending upward from a hole in its center, which (the tube $j$) is provided, at its upper end, with tongues $j'$ $j'$, which serve to hold the disk J in any desired elevation upon the tube H, on which it slides. K is a rod, extending from the tube $j$ upward through an opening in the cap G. L L are air-pumps, securely mounted on the cap G, and with their discharge ends communicating with the interior and upper end of the pipe H, and are provided with the usual valves $l$ $l'$, pistons $m$, and rods $m'$, extending upward to the operating-lever M, which is pivoted centrally on standards $n$, extending upward from the cap G.

The operation of my invention is as follows: The cap G may be removed and the milk or cream to be operated on be placed in the vessel A, when the cap may be again replaced. The disk J may then be adjusted by means of the rod K, so as to rest upon the upper surface of the cream, where it will be held by the clamps $j'$ $j'$. The air-pumps may now be operated, and will alternately force a stream of air down the pipe H and out through the openings $i'$ $i''$, which are arranged in the most favorable condition for producing the greatest commotion of the cream with a given quantity of air. The accumulated air in the churn may escape through the hole $a$, and any cream escaping above may return through the same, an annular channel or groove in the top of the vessel B facilitating its return.

The disk J is somewhat smaller than the interior circumference of the vessel A, so that the butter, as fast as it is formed, may float up around its outer edge and lodge upon its upper surface.

When the churning is completed, the buttermilk may be withdrawn through the cock E, and the lid G again removed to obtain the butter and clean the vessel A.

The temperature of the cream may be regulated by water introduced in the vessel B through the funnel-shaped spout C, which water may be entirely withdrawn, when desired, through the cock $d$, or partially withdrawn, for the purpose of admitting the introduction of more warm or cold water for raising or lowering the temperature, respectively, the pipe D allowing the air to escape as the annular vessel B is being filled with water.

I claim—

The adjustable disk J upon the air-tube H, having distributer I at its base, arranged within the vessel A, surrounded by a water-vessel, B, in connection with the air-pumps L L, substantially as specified.

KAYRIN NOLAN.

Witnesses:
J. J. TUNNICLIFF,
BERNARD RYAN.